(12) United States Patent
Sexton et al.

(10) Patent No.: US 10,160,185 B2
(45) Date of Patent: Dec. 25, 2018

(54) CFKC MULTIPLE PROTECTION SYSTEM STRUCTURE

(71) Applicants: Aron Elizabeth Sexton, Columbia, MO (US); Eston Fraizer Livingston, Whitewater, MO (US)

(72) Inventors: Aron Elizabeth Sexton, Columbia, MO (US); Eston Fraizer Livingston, Whitewater, MO (US)

( * ) Notice: Subject to any disclaimer, the term of this patent is extended or adjusted under 35 U.S.C. 154(b) by 309 days.

(21) Appl. No.: 15/061,704

(22) Filed: Mar. 4, 2016

(65) Prior Publication Data

US 2016/0327374 A1   Nov. 10, 2016

Related U.S. Application Data

(60) Provisional application No. 62/141,029, filed on Mar. 31, 2015.

(51) Int. Cl.
*B32B 15/14* (2006.01)
*A41D 1/00* (2018.01)
(Continued)

(52) U.S. Cl.
CPC ............ *B32B 15/14* (2013.01); *A41D 1/00* (2013.01); *B32B 5/024* (2013.01); *B32B 5/26* (2013.01); *B32B 15/20* (2013.01); *B32B 27/12* (2013.01); *B32B 27/302* (2013.01); *F41H 5/0485* (2013.01); *B32B 2255/02* (2013.01); *B32B 2260/021* (2013.01); *B32B 2260/04* (2013.01); *B32B 2260/046* (2013.01); *B32B 2262/0269* (2013.01); *B32B 2262/065* (2013.01); *B32B 2262/106* (2013.01); *B32B 2307/206* (2013.01); *B32B 2307/30* (2013.01); *B32B 2307/304* (2013.01); *B32B 2307/3065* (2013.01); *B32B 2307/581* (2013.01); *B32B 2571/02* (2013.01)

(58) Field of Classification Search
CPC .......... B32B 15/14; B32B 15/20; B32B 5/26; B32B 5/024; B32B 27/302; B32B 27/12; B32B 2307/304; B32B 2571/02; B32B 2307/30; B32B 2255/02; B32B 2262/0269; B32B 2260/021; B32B 2260/04; B32B 2260/046; B32B 2262/106; B32B 2307/206; B32B 2307/3065; B32B 2307/581
See application file for complete search history.

(56) References Cited

U.S. PATENT DOCUMENTS

| | | | | |
|---|---|---|---|---|
| 5,472,769 A | * | 12/1995 | Goerz, Jr. | B32B 5/26 428/138 |
| 5,529,826 A | * | 6/1996 | Tailor | A61F 5/01 428/110 |
| 2016/0114558 A1 | * | 4/2016 | Livingston | B32B 5/26 428/76 |

* cited by examiner

*Primary Examiner* — Kevin R Kruer

(57) ABSTRACT

The claimed invention differs from what currently exists as Kevlar core is encased by resinated Jute/burlap, with optional addition of one or more layers of resinated Kevlar, and/or Carbon Fiber for additional structural support. Insulation and barrier is inserted to overcome backface deformation and blast overpressure to the composite. Less the 0.2 mm aluminum sheeting is inserted to deflect electromagnetic pulse jamming. Entire composite is then coated with insulating intumescing or other class A fire resistant coating. This results in a Composite which becomes very strong with a reduction in raw material costs, that is not only resistant to projectiles, but is also resistant to acid, blast overpressure, backface deformation, electromagnetic pulse and direct flame in excess of 2,000 degrees Fahrenheit.

4 Claims, 1 Drawing Sheet

(51) Int. Cl.
*F41H 5/04* (2006.01)
*B32B 27/30* (2006.01)
*B32B 5/02* (2006.01)
*B32B 5/26* (2006.01)
*B32B 27/12* (2006.01)
*B32B 15/20* (2006.01)

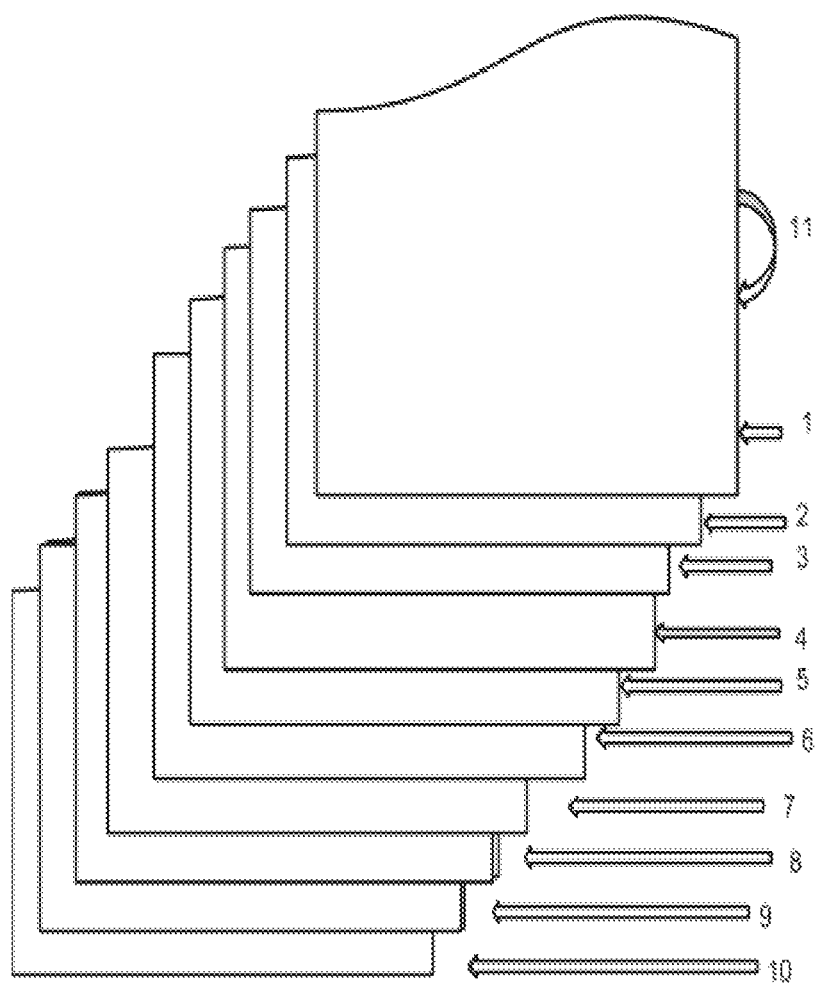

CFKC MULTIPLE PROTECTION SYSTEM STRUCTURE

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC

Not Applicable

BACKGROUND OF THE INVENTION

Law Enforcement, Public Servants, Military Personnel and their property are not sufficiently protected from high powered rapid rifle fire, armor piercing rounds and other high grade ballistic arms. This has occurred due to added weight, available grades and cost effectiveness of such armor. This leaves public servants and their equipment inadequately protected while responding to calls that have weapons of this magnitude involved.

BRIEF SUMMARY OF THE INVENTION

This invention provides, multiple protection from a variety of threats, cost reducing innovation and overall weight reduction.

An embodiment of this invention is its ability to be molded into various shapes and sizes which can be produced into various grades for the protection from ballistic impact, varying acids, ambient excessive heat and direct flame in excess of 2,000 degrees Fahrenheit.

It is another aspect of the invention to provide protection against backface deformation to the composite structure from blast overpressure.

It is another aspect of the invention to provide protection against electromagnetic pulse jamming.

DESCRIPTION OF THE SEVERAL VIEWS OF THE DRAWING

FIG. 1 is a detailed drawing showing the composite panels in accordance with the invention.

DETAILED DESCRIPTION OF THE INVENTION

Shown in FIG. 1, is an invention which can be molded or made into various sizes, shapes and grades. This invention has one or more layers of woven Jute, or other forms of burlap which are stacked/layered or spun. Preferably one or more layers of Kevlar is added to the Jute/burlap for added structural strength. The number of layers of Jute and Kevlar Cloth can vary and depends on the strength/grade desired. The above mentioned layers are wrapped around multiple layers of ballistic resistant fabric preferably Kevlar (known as the core). Along with the electromagnetic pulse and blast, overpressure barrier. Resin saturation is applied and pressure molding if warranted. Other methods of material application matrix may be used, such as filament winding of the fiber to create a more uniformed structure. Invention is then coated and/or dipped in preferably insulating intumescing. Insulating intumescing may also be used throughout the multiple layers of the invention to further increase fire protection.

REFERENCE 1-11

1—Depicts one or more layers of woven Jute, the glossy fiber of either of two East Indian plants (*Corchorus olitorius* and *C. capsularis*) of the linden family (Tiliaceae), or burlap that is hardened with resin with or without Pigment. Within the one or more layers of Jute/Burlap, one or more layers of Kevlar/Aramid Fiber or Carbon Fiber Cloth are added for additional structural support.

2—Depicts one or more layers of aluminium which is less than 0.2 mm in thickness.

3—Depicts one or more layers of Ballistic Resistant core comprised of of multiple layers of ballistic resistant material, preferably Kevlar.

4—Depicts one or more layers of polystyrene insulation or other materials which are well known for natural and synthetic insulation properties.

5—Depicts one or more layers of woven Jute, the glossy fiber of either of two East Indian plants (*Corchorus olitorius* and *C. capsularis*) of the linden family (Tiliaceae), or burlap, that is fused to the next layer by resin with or without Pigment. Within the one or more layers of Jute/Burlap one or more layers of Kevlar/Aramid Fiber or Carbon Fiber Cloth are added for additional structural support.

6—Depicts one or more layers of Ballistic Resistant core comprised of of multiple layers of ballistic resistant material, preferably Kevlar.

7—Depicts one or more layers of polystyrene insulation or other materials which are well known for natural and synthetic insulation properties.

8—Depicts one or more layers of Carbon Fiber Cloth or Ballistic Resistant Fabric preferably Kevlar or other materials which are well known for synthetic and natural ballistic resistant materials. Such as ceramics, PBO fiber, para-aramid synthetic fiber, polyethylene fiber and fiberglass, that is fused together by resin with or without Pigment.

9—Depicts one or more layers of polystyrene insulation or other materials which are well known for natural and synthetic insulation properties.

10—Depicts one or more layers of woven Jute, the glossy fiber of either of two East Indian plants (*Corchorus olitorius* and *C. capsularis*) of the linden family (Tiliaceae), or burlap, that is fused to the next layer by resin with or without Pigment. Within the layers of Jute/Burlap one or more layers of Kevlar/Aramid Fiber or Carbon Fiber Cloth are added for additional structural support.

11—Depicts insulating intumescing which surrounds composite and/or is infused in the layers of composite.

The invention claimed is:

1. A ballistic resistant composite comprising: An intumescent casing surrounding a core wherein the core comprises the following layers in order:
   an outer layer comprising at least one layer of Jute or sisal fibers hardened with resin;
   a metal or metal alloy layer having a thickness 0.2 mm or less wherein the metal is selected from the group consisting of aluminum, lead, iron, zinc, palladium, titanium, nickel, gold, pewter, copper, silver and platinum;

multiple layers of ballistic resistant material selected from the group consisting of Kevlar, carbon fiber, ceramics, PBO fiber, para-aramid synthetic fiber, polyethylene fiber and fiberglass;

an insulation layer selected from the group consisting of polystyrene, gypsum board, wood fiber, polyisocyanurate, asphalt-impregnated fiberboard, cement board and cardboard;

at least one layer comprising jute or sisal fibers hardened with resin;

multiple layers of ballistic resistant material selected from the group consisting of Kevlar, carbon fiber, ceramics, PBO fiber, para-aramid synthetic fiber, polyethylene fiber and fiberglass;

an insulation layer selected from the group consisting of polystyrene, gypsum board, wood fiber, polyisocyanurate, asphalt-impregnated fiberboard, cement board and cardboard;

multiple layers of ballistic resistant material selected from the group consisting of Kevlar, carbon fiber, ceramics, PBO fiber, para-aramid synthetic fiber, Polyethylene fiber and fiberglass;

an insulation layer selected from the group consisting of polystyrene, gypsum board, wood fiber, polyisocyanurate, asphalt-impregnated fiberboard, cement board and cardboard; and at least one layers comprising Jute or sisal fibers hardened with resin.

2. A ballistic resistant material of claim 1 wherein said outer layer further comprises one or more layers comprising Kevlar, Aramid or Carbon Fiber for added strength.

3. A ballistic resistant material of claim 1 wherein said intumescent casing comprises a Class A fire protection coating.

4. A ballistic resistant material of claim 1 wherein said at least one layer comprising Jute or sisal fibers further comprise other natural fibers.

* * * * *